US00RE34852E

United States Patent [19]

Burroughs

[11] E Patent Number: Re. 34,852

[45] Reissued Date of Patent: Feb. 7, 1995

[54] CONTROL CABLE HOUSING SEAL AND LUBRICANT FOR MARINE STEERING SYSTEM

[75] Inventor: Thomas C. Burroughs, Houston, Tex.

[73] Assignee: Worldwide Marine Distribution Company, Houston, Tex.

[21] Appl. No.: 5,153

[22] Filed: Jan. 15, 1993

Related U.S. Patent Documents

Reissue of:

[64] Patent No.: 5,061,213
Issued: Oct. 29, 1991
Appl. No.: 566,035
Filed: Aug. 13, 1990

[51] Int. Cl.[6] ..... B63H 5/12

[52] U.S. Cl. ..... 440/63

[58] Field of Search ..... 114/144 R; 440/53, 61, 440/62, 63, 113; 180/137, 145, 150, 152; 184/6.19, 105.3, 18, 21, 24; 74/501.4–501.6

[56] References Cited

U.S. PATENT DOCUMENTS 1,504,452 8/1924 Hirst .
1,572,073 2/1926 Murphy .
2,064,377 12/1936 Gordon .
2,083,937 6/1937 Begg .
3,143,994 8/1964 Morse .
4,415,064 11/1983 Oliemuller .
4,619,298 10/1986 Broussard ..... 141/392
4,735,165 4/1988 Baba et al. ..... 440/62
4,815,994 3/1989 Hickman, Jr. ..... 440/62

FOREIGN PATENT DOCUMENTS 746071 2/1933 France .

*Primary Examiner*—Jesûs D. Sotelo
*Attorney, Agent, or Firm*—Bush, Moseley, Riddle & Jackson

[57] ABSTRACT

A lubricant and seal arrangement for the control cable and control cable housing of a marine steering system wherein the control cable is connected at one end to move the control cable longitudinally and at its other end to a tubular member that is telescopically movable in the control cable housing in response to movement of the control cable upon rotation of the steering wheel of the marine system which arrangement includes the tubular control cable housing with a longitudinal bore therethrough to receive the control cable through and into the bore and an open end at the other end of the bore. An inner tubular member extends from said one end of the control cable housing in spaced radial relation thereto to form an annular extending void and a tubular member is connected to the other end of the axial control cable. The tubular member is telescopically reciprocable through the open end bore of the control cable housing in response to movement of the cable and a seal adjacent the control cable housing open end sealably engages the tubular member.

7 Claims, 2 Drawing Sheets

CONTROL CABLE HOUSING SEAL AND LUBRICANT FOR MARINE STEERING SYSTEM

Matter enclosed in heavy brackets [ ] appears in the original patent but forms no part of this reissue specification; matter printed in italics indicates the additions made by reissue.

STATEMENT OF THE PRIOR ART

The marine steering system for an outboard motor, an inboard outdrive with an inboard motor and an inboard motor employs a flexible coaxial cable of well known construction that extends through a flexible tube. The flexible tube is fixed at one end to the steering housing of the marine craft and is connected at its other end to a tubular control cable housing supported by the boat motor or boat depending on the type of boat propulsion system. The coaxial cable is associated with or mechanically connected at its end adjacent the steering wheel a gear or a suitable mechanism so that when the steering wheel of the marine craft is turned, the coaxial cable is moved longitudinally within the flexible tube. The other end of the coaxial cable is connected to a tubular member at one of its ends. This tubular member extends through an open end of and is reciprocable within the control cable housing. The tubular member end which projects from the open end of the cable housing is connected by linkage to turn either the motor and associated propellor or the rudder, depending upon the type of propulsion system for the boat.

Heretofore, substantial problems and expense have been encountered because corrosion or sediment accumulation in the control cable housing interferes with or prevents free unrestricted longitudinal movement of the coaxial cable in the housing which renders the steering system difficult to operate or inoperable. It is not uncommon for the fouling of the control cable housing to require removal of the outboard motor from the boat and replacement of the control cable housing. Also, deterioration of the coaxial cable due to exposure of the coaxial cable to the water environment with which it is associated creates problems as it is substantially impossible to determine with any degree of accuracy the internal condition of the coaxial cable within the control cable housing without complete disassembly, and even then the interior condition of the coaxial cable may not be properly or adequately determined. Further, lubricant substantially increases the functional life of a coaxial cable and the arrangement herein described enables the coaxial cable to receive such lubricant without disassembly of the steering system as well as inhibiting fouling of the cable housing and thereby substantially increases the operational life of the steering system.

Failure of the steering systems presently employed with marine craft, which use coaxial cable, may occur at any time without warning causing accidents or other disastrous results, such as being stranded offshore. Even greater problems are presented with present craft capable of speeds of 100 miles per hour or greater. Should the cable break or separate at high speed, torque from the motor can cause spinning and overturning of the boat or throwing passengers from the boat.

SUMMARY OF THE INVENTION

The present invention provides a relatively simple and economical lubricant and seal arrangement for use with the control cable housing of a marine steering system to eliminate deterioration of the system due to salt water, foreign particles or other substances from gaining access to the control cable housing, the tubular member associated therewith and the coaxial cable which substances interfere with proper movement of the tubular member in the cable housing upon longitudinal movement of the coaxial cable. It also prevents access to the coaxial cable by elements including water, weather and the like which cause internal disintegration and deterioration of the control cable, cable housing and associated components that are not visible to the eye.

Other objects and advantages of the present invention will become more readily apparent from a consideration of the following drawings and description.

DESCRIPTION OF THE PREFERRED EMBODIMENTS

The present invention will be described in detail with regard to its application and use in connection with an outboard motor; however, it can be appreciated that it may be employed with any propulsion system used for propelling marine craft or boats which employ a coaxial cable for steering the boat.

Figure 1:
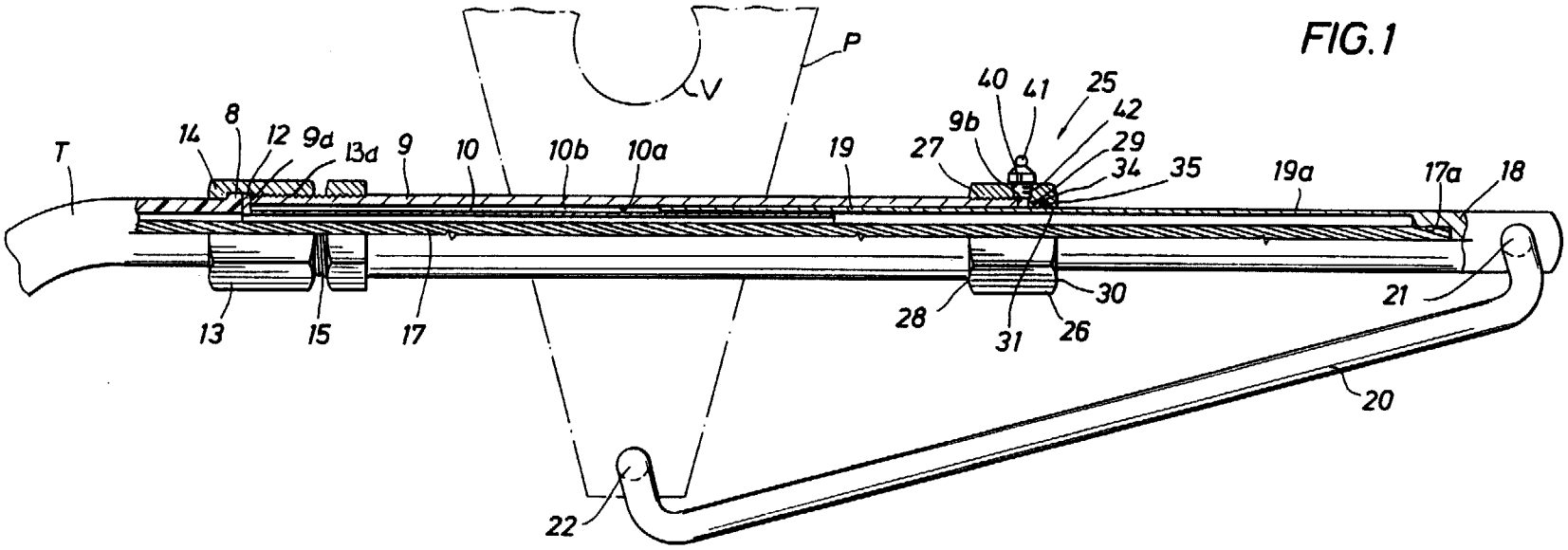
FIG. 1 is a partial diagrammatic view of one form of the invention representing in dotted outline a tiller arm associated with an outboard motor with the control cable housing illustrated in one-quarter sectional view and the coaxial cable for the marine steering system extending therethrough and connected to a tubular member that is telescopically reciprocable relative to the control cable housing.

Attention is first directed to FIG. 1 wherein a member normally termed a tiller arm associated with the motor of an outboard motor is represented schematically by the letter P. A flexible tube end is shown at T which is fixed in a manner well known in the art at its other end T adjacent or to the steering wheel housing of a marine craft such as a boat. The end T includes an annular flange 8 as shown in FIG. 1. The tube end T is connected to the tubular cable housing 9 by any suitable means and as shown an inner tube 10 extends longitudinally within the cable housing 9 and is provided at one end with an annular flange or shoulder 12 for abutting between the annular flange 8 on tube end T and the end 9a of the control cable housing 9. The tube end T is secured in position on the one end of the control cable housing 9 by the coupling or connector nut 13 between the shoulder 12 on inner tube 10 and annular inwardly depending shoulder or flange 14 on nut 13 as shown. Suitable engaging means such as threads 15 are provided adjacent the one end of the control cable housing 9 for co-engaging with internal threads 13a of the connector nut 13.

To assemble the tube end T and the control cable housing 9 as shown, the inner tube 10 may be positioned longitudinally within the one end of the control cable housing 9 so that one side of the annular flange or shoulder 12 thereon rests on the end 9a of the control cable housing. The connector 13 may be positioned over the end of the flexible tube end T to receive the flanged end 8 therein as shown and then threadedly engaged on the threads 15 of the control cable housing 9 to clamp the annular flange 8 on the end T of the flexible tube between the inner annular surface on the flange 14 and the outer surface of the flange 12.

Figure 5:
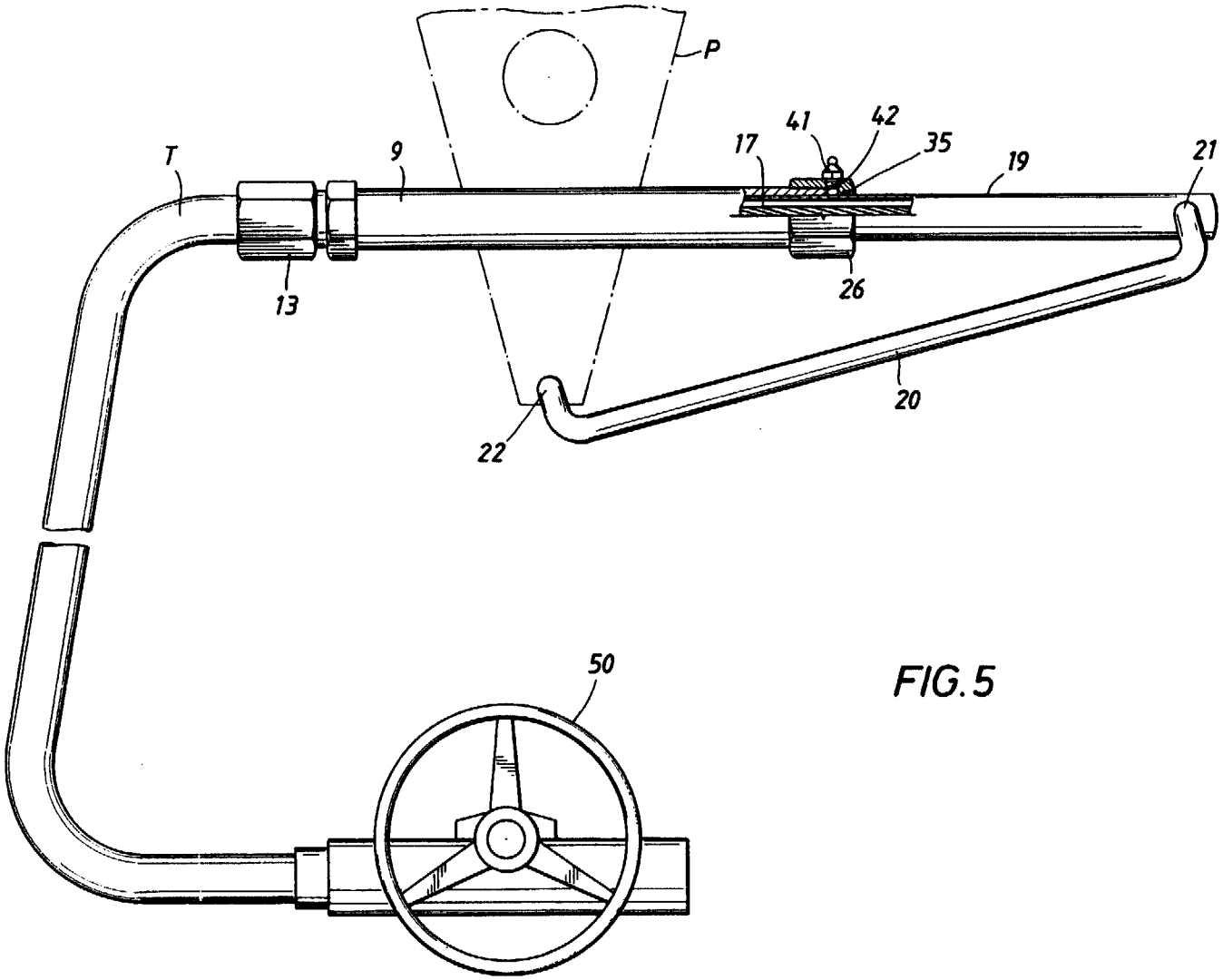
FIG. 5 is a diagrammatic view similar to FIG. 1 showing the invention associated with the steering wheel of a marine steering system.

The coaxial cable is represented at 17 and it extends through the flexible tube end T from adjacent the steering wheel through tube end T for connection with tubular member 19, as will be described. The coaxial cable is connected at one end in a manner well known in the art as illustrated in FIG. 5 adjacent the boat steering wheel 50 to a well known mechanism which causes the cable 17 to move longitudinally within and through inner tube 10 and cable housing 9 into which it extends in response to rotation of the boat steering wheel 50. The cable is connected at its outer or other end 17a to the solid end portion 18 of tubular member 19. Tubular member 19 extends through the open end 9b of the tubular control cable housing 9 as shown and is telescopically movable within the longitudinally extending annular recess or void 10a. The annular void 10a is formed between the small outer diameter of the inner 10 and the larger inner diameter of the control cable housing 9 as illustrated. The inner tube 10 thus serves as a guide for the tubular member 19 as it telescopically reciprocates through open end 9b relative to the control cable housing 9 in response to longitudinal movement of the control cable 17 as will be described in greater detail.

A mechanical link or rod 20 is pivotally mounted as illustrated at 21 adjacent the other end of the tubular member 19 and is also pivotably mounted as illustrated at 22 to the tiller arm P of the motor. The outboard motor and propellor are mounted on the boat transom to pivot, represented at V in FIG. 1, about a vertical plane and this pivoting movement serves to turn the boat to the right or left in response to turning the steering wheel of the steering system of the boat.

Specifically, when the coaxial cable 17 is moved longitudinally in response to rotation of the steering wheel 50, such movement is transmitted to the tubular member 19 to move it longitudinally of and within cable housing 9 which in turn causes the link 20 connected thereto and tiller arm P to move and effect rotation of the motor and propellor to turn the boat to the right or the left. The outboard motor is pivotally mounted on the boat in a manner well known in the art so that the motor and propellor may be pivoted up out of the water when not in use and down into the water when it is desired.

When the coaxial cable 17 is moved by the steering wheel 50 so as to pull on the cable 17 and move it to the left as viewed in FIG. 1 of the drawings, the motor, propellor and tiller arm P are rotated towards the left as viewed in FIG. 1 of the drawings and the boat turns to the left. Similarly, when the steering mechanism is turned in the opposite direction so that the cable 17 is pushed outwardly relative to the flexible tube end T, that is, to the right as viewed in FIG. 1 of the drawings, the control cable housing 9, the motor, propellor and tiller arm P are moved to the right as viewed in the drawings which causes the boat on which the motor, propellor and tiller arm P are supported to turn to the right.

Figure 4:
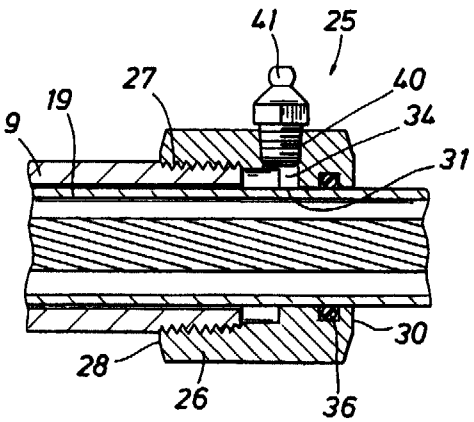
FIG. 4 is a sectional view which illustrates yet another form.
Figure 3:
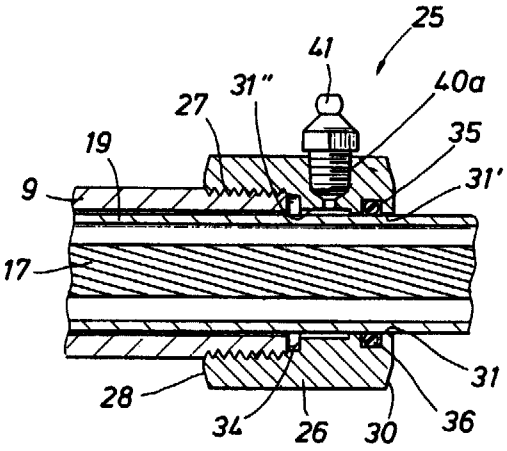
FIG. 3 illustrates an other embodiment of the lubricant and seal arrangement.
Figure 2:
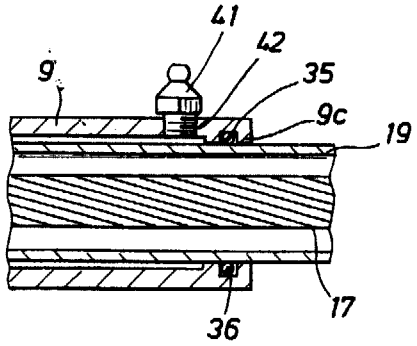
FIG. 2 is a sectional view of another form of the lubricant and seal arrangement for use with the control cable housing of a marine steering system.

FIG. 1 illustrates one form of the present arrangement which includes the adapter referred to generally at 25 having a longitudinally extending body 26. The longitudinally extending body 26 includes a bore 27 extending from one end 28 of said body 26, which bore 27 terminates in spaced relation as illustrated at 29 to the other end 30 of the longitudinal body 26 and includes threads in bore 27. The longitudinal body 26 includes a counterbore 31 extending from the other body end 30 and such counterbore 31 is coaxial with, and of a smaller diameter than, the bore 27. The counterbore 31 intersects the larger diameter bore 27 to form an annular shoulder surface 34 at the juncture of the intersection as represented in the drawings. An annular recess 35 is provided between the other end 30 of said body 26 and the shoulder 34 of said body bore 27 and counterbore 31 as shown in the drawings, which annular recess receives seal means 36, as shown in FIGS. 2–4 for slidably receiving and sealing with the outer annular surface 19a of the tubular member 19. It will be noted that the counterbore 31 is preferably smooth for slidably receiving the tubular member therethrough. A lateral opening 40 extends through said longitudinal body 26 and intersects only the bore 27. The opening 40 is threaded for receiving the hydraulic fitting. The hydraulic fitting 41 is of well known configuration and includes any suitable means such as threaded end 42 for connection with the lateral opening 40 and a suitable one-way acting check valve in a longitudinal passage for discharge of lubricant therethrough while preventing backflow out of the fitting 41. Lubricant discharged through 41 is received on outer surface 19a of tubular member 19 and spread to all components within the housing 9. Sufficient lubricant can be supplied and maintained in the present arrangement to lubricant inner tube surface 10b and discharge lubricant to the interior of inner tube 10 for the coaxial cable 17.

In FIG. 3 embodiment, the lubricant and seal adapter 25 are shown with like numerals applied to like parts; however, it will be noticed that in this form the lateral opening 40a is positioned on the longitudinal body 26 so that it extends only through the thicker portion thereof to intersect or communicate with only the smaller diameter bore 31. The reduced diameter bore 31 includes, or is formed by, two longitudinally extending different diameters represented at 31' and 31'', the latter being of a still smaller inner diameter than the bore portion 31'. The smaller diameter bore 31' terminates at the intersection with the body bore 27 to form the annular shoulder surface 34 by the intersection of 31'' and 27. Where the opening 40a is only in counterbore 31, the reduced diameter portion 31'' enables the lubricant discharge through the hydraulic fitting into the adapter 25 to be more easily conducted onto the surface 19a of the tubular member 19 to lubricate the surfaces as previously described.

In the FIG. 4 embodiment, it will be noted that the lateral opening 40 intersects a portion of the larger diameter bore 27 as well as a portion of the smaller diameter counterbore 31 so that opening 40 communicates with both bores. When lubricant is injected into the hydraulic fitting 41, it is conducted therethrough and past the one-way acting check valve and injected onto the surface 19a of the tubular member 19. When the tubular member 19 is reciprocated by movement of the coaxial cable as heretofore described, such lubricant is spread along the interior wall surface of the coaxial cable housing 9 and on the outer surface of the inner tube 10, as well as to the coaxial cable 17. Sufficient lubricant may be applied to accomplish this function and may be re-added from time to time as necessary. The seal 36 as previously noted, engages the outer surface 19a of the tubular member and inhibits loss of lubricant therethrough. FIG. 2 illustrates another form of the arrangement wherein the control cable housing 9 is provided with an annular inwardly depending portion 9c, preferably adjacent the open other end 9b of the cable housing, in which is provided an annular recess 35 for receiving a seal 36 therein.

The annular surface on the member 19 sealingly engages the seal 36 to assist in retaining lubricant supplied to the interior of the control cable housing to be applied to the surface 19a and for distribution to the surfaces of inner tube 10 and out the end 10c of the void 10a between the cable housing 9 and the inner tube 10 to the coaxial cable 17 as previously described.

The lubricant and seal arrangement of the present invention may be employed with a coaxial cable, coaxial control cable housing and tubular member which reciprocates in the control cable housing regardless of the type propulsion employed, whether it is outboard motor, an inboard outdrive or an inboard motor. Where an inboard outdrive or inboard motor is employed, the coaxial cable extends from the steering wheel to the rudder to move the rudder instead of the motor as with an outboard motor; however, regardless of the type propulsion system employed on the boat, the present invention has application wherever a coaxial control cable housing is employed with a coaxial cable and a tubular member to either turn the motor to effect steering of the craft or to effect turning of a rudder to cause the craft to turn as desired.

The foregoing disclosure and description of the invention are illustrative and explanatory thereof, and various changes in size, shape and materials as well as in the details of the illustrated construction may be made without departing from the spirit of the invention.

What is claimed is:

1. A lubricant and seal arrangement for the control cable and control cable housing of a marine steering system wherein the control cable is connected to a tubular member that is telescopically movable in and out relative to the control cable housing in response to rotation of the steering wheel of the marine steering system, said lubricant and seal arrangement comprising:

an adapter having a longitudinally extending body;

said body having a bore extending from one end of said body terminating in spaced relation to the other end of said body;

threads in said bore securing said body to the control cable housing;

said body having a counterbore extending from the other end of said body which counterbore intersects said body bore and of a smaller internal diameter than the diameter of said threaded body bore;

an annular shoulder surface formed by the intersection of said body bore and said counterbore;

an annular recess between the other end of said longitudinal body and the intersection of said body bore and counterbore;

seal means for said annular recess to sealably engage the telescopically movable member;

a lateral opening extending through said longitudinal body; and a hydraulic fitting for positioning in said opening.

2. The adapter of claim 1 wherein said lateral opening intersects said counterbore between said annular shoulder surface and said annular recess.

3. The adapter of claim 1 wherein said lateral opening intersects said body bore and said counterbore.

4. The adapter of claim 1 wherein said lateral opening intersects only said bore having threads.

*5. A lubricant and seal arrangement for the control cable and control cable housing of a marine steering system wherein the control cable is connected to a tubular member that is telescopically movable in and out relative to the control cable housing in response to rotation of the steering wheel of the marine steering system, said lubricant and seal arrangement comprising:*

*an adapter having a longitudinally extending body;*

*said body having a bore extending from one end of said body terminating in spaced relation to the other end of said body;*

*threads in said bore for securing said body;*

*said body having a counterbore extending from the other end of said body which counterbore intersects said body bore and is of a smaller internal diameter than the diameter of said threaded body bore;*

*an annular shoulder surface formed by the intersection of said body bore and said counterbore;*

*an annular recess between the other end of said longitudinal body and the intersection of said body bore and counterbore;*

*seal means for said annular recess;*

*a lateral opening extending through said longitudinal body; and*

*a hydraulic fitting for positioning in said opening.*

*6. A lubricating nut for use with the control cable and control cable housing of a marine steering system and comprising:*

*a longitudinally extending body;*

*said body having a bore extending from one end of said body terminating in spaced relation to the other end of said body;*

*threads in said bore for securing said body;*

*said body having a counterbore extending from the other end of said body which counterbore intersects with body bore and is of a smaller internal diameter than the diameter of said threaded body bore;*

*an annular shoulder surface formed by the intersection of said body bore and said counterbore;*

*an annular recess between the other end of said longitudinal body and the intersection of said body bore and counterbore;*

*seal means for said annular recess;*

*a lateral opening extending through said longitudinal body; and*

*a hydraulic fitting for positioning in said opening.*

*7. In a marine steering system having a manually operated steering wheel and a control cable connected at one end to said steering wheel for steering a marine craft;*

*a relatively fixed tubular control cable housing having a longitudinal bore therethrough receiving the control cable, said control cable housing having an open outer end remote from the steering wheel with the other end of the control cable extending from said open outer end of the control cable housing;*

*an outer tubular member telescopically mounted within said control cable housing for sliding movement and secured to the other end of said control cable, said*

*tubular member movable with said control cable in and out relative to said control cable housing in response to movement of said control cable upon rotation of said steering wheel;*

*an inner tube extending from the other end of the control cable housing adjacent the steering wheel in spaced radial relation to the inner diameter of said longitudinal bore of said control cable housing to form an annular longitudinally extending annular void between the cable housing and said inner tube for receiving therein in telescoping relation the outer tubular member secured to said control cable;*

*an annular seal carried by said control cable housing adjacent said open outer end thereof for sealably engaging said telescoping tubular member;*

*an opening extending through said control cable housing adjacent said annular seal and in communication with said tubular member; and*

*a hydraulic fitting for positioning in said opening to permit the application of lubricant against said sliding tubular member.*

* * * * *